US008158700B2

(12) United States Patent
Chen et al.

(10) Patent No.: US 8,158,700 B2
(45) Date of Patent: Apr. 17, 2012

(54) METHOD OF IMPROVING AFFINITY BETWEEN FILLER AND POLYMERS HAVING A LOW DEGREE OF UNSATURATION

(75) Inventors: Zhong-Ren Chen, Stow, OH (US); Zengquan Qin, Copley, OH (US); Hiroshi Mouri, Tokyo (JP); Yuan-Yong Yan, Copley, OH (US); Mindaugas Rackaitis, Massillon, OH (US)

(73) Assignee: Bridgestone Corporation, Tokyo (JP)

( * ) Notice: Subject to any disclaimer, the term of this patent is extended or adjusted under 35 U.S.C. 154(b) by 516 days.

(21) Appl. No.: 12/200,103

(22) Filed: Aug. 28, 2008

(65) Prior Publication Data
US 2009/0062434 A1 Mar. 5, 2009

Related U.S. Application Data

(60) Provisional application No. 60/969,296, filed on Aug. 31, 2007.

(51) Int. Cl.
*C08L 95/00* (2006.01)
*C08L 9/00* (2006.01)
(52) U.S. Cl. ............................ 524/59; 524/570; 524/571

(58) Field of Classification Search ................... 524/59, 524/570, 571
See application file for complete search history.

(56) References Cited

U.S. PATENT DOCUMENTS

| 4,003,420 | A | 1/1977 | Sandstrom et al. |
| 4,801,641 | A | 1/1989 | Ogawa et al. |
| 4,886,850 | A | 12/1989 | Ogawa et al. |
| 4,973,623 | A | 11/1990 | Haugsby et al. |
| 5,258,578 | A * | 11/1993 | Smith et al. ..................... 174/93 |
| 6,279,633 | B1 | 8/2001 | Corvasce |
| 6,855,776 | B2 * | 2/2005 | Chao et al. ................. 525/333.2 |
| 2009/0054581 | A1 * | 2/2009 | Prud'Homme et al. ...... 524/495 |

* cited by examiner

*Primary Examiner* — Robert D. Harlan
(74) *Attorney, Agent, or Firm* — Meredith E. Hooker; Nathan T. Lewis

(57) ABSTRACT

Provided is a composition comprising at least one polymer having a degree of unsaturation of no more than about 50 mol %; a filler selected from the group consisting of carbon black, silica, and mixtures thereof; and a polymeric additive comprising a functional end group reactive with said filler, wherein said polymeric additive has a degree of unsaturation of no more than about 50 mol % and a number average molecular weight between about 1,000 and about 25,000. The composition may optionally contain one or more polymers having a degree of unsaturation of more than 50 mol %. The composition may be particularly useful as a component for a tire.

25 Claims, No Drawings

US 8,158,700 B2

METHOD OF IMPROVING AFFINITY BETWEEN FILLER AND POLYMERS HAVING A LOW DEGREE OF UNSATURATION

This application claims the benefit of U.S. Provisional Application No. 60/969,296, filed Aug. 31, 2007, which is incorporated herein by reference.

FIELD OF THE DISCLOSURE

The disclosure relates to a method of improving the affinity between a filler and a polymer having a low degree of unsaturation. The disclosure also relates to a method of improving the filler distribution in a polymer having a low degree of unsaturation.

BACKGROUND OF DISCLOSURE

Rubber compositions for tire sidewalls may contain various diene rubbers, including natural rubber (NR) and polybutadiene rubber (BR). However, since these rubbers have a high degree of unsaturation, i.e. they contain a high amount of carbon-carbon double bonds, they are highly susceptible to oxidation and ozone. To improve the resistance to oxidation and ozone, it is known to add antioxidants and antiozonants to the rubber composition. Despite the improved resistance to oxidation and ozone, many of the antioxidants and antiozonants migrate to the surface of the sidewall causing the sidewall to have an unattractive brown appearance.

To reduce the amount of necessary antioxidants and antiozonants, it is known to add polymers having a low degree of unsaturation which are less susceptible to oxidation and ozonation, such as ethylene propylene diene monomer (EPDM). However, polymers having a low degree of unsaturation typically have a lower affinity towards fillers such as carbon black and silica. This results in less reinforcement in the polymer, leading to lower crack growth resistance.

It is also known to add functional groups to polymers in order to increase the affinity between a polymer and filler. Functional groups may be added by functional initiators and/or functional terminators. This process yields at most two functional groups per polymer chain. However, due to the high molecular weight of polymers, there are typically relatively few functional groups available to interact with the filler.

There is a need for a method to improve the filler affinity to polymers having a low degree of unsaturation.

SUMMARY OF DISCLOSURE

Provided is a composition comprising at least one polymer having a degree of unsaturation of no more than about 50 mol % (hereinafter referred to as a "Type A polymer"); a filler selected from the group consisting of carbon black, silica, and mixtures thereof; and a polymeric additive comprising a functional end group reactive with said filler, wherein said polymeric additive has a degree of unsaturation of no more than about 50 mol % and a number average molecular weight between about 1,000 and about 25,000. The composition may optionally contain one or more polymers having a degree of unsaturation of more than 50 mol % (hereinafter referred to as a "Type B polymer"). The composition may be particularly useful as a component for a tire.

Also provided is a method comprising mixing together at least one Type A polymer; optionally at least one Type B polymer; a filler selected from the group consisting of carbon black, silica, and mixtures thereof; and a polymeric additive comprising a functional end group reactive with said filler, wherein said polymeric additive has a degree of unsaturation of no more than about 50 mol % and a number average molecular weight between about 1,000 and about 25,000.

Also provided is a method comprising (a) in a mixing stage, mixing together at least one Type A polymer, a filler selected from the group consisting of carbon black, silica, and mixtures thereof, and a polymeric additive comprising a functional end group reactive with said filler, wherein said polymeric additive has a degree of unsaturation of no more than about 50 mol % and a number average molecular weight between about 1,000 and about 25,000; (b) in a separate mixing stage, mixing together at least one Type B polymer, a filler selected from the group consisting of carbon black, silica, and mixtures thereof; and (c) mixing the mixtures obtained in steps (a) and (b) together.

DETAILED DESCRIPTION

The composition contains at least one Type A polymer having a low degree of unsaturation. The Type A polymer(s) may have a degree of unsaturation of no more than about 50 mol %, or alternatively no more than about 30 mol %, or alternatively no more than about 10 mol %. Suitable Type A polymers include, but are not limited to, ethylene propylene rubber (EPR), ethylene propylene diene monomer (EPDM) rubber, butyl rubber, polychloroprene, hydrogenated nitrile rubber, and mixtures thereof.

A polymeric additive is added to the composition to increase the affinity between the filler and the Type A polymer (s). The polymeric additive may be present at a level of about 1 to about 50 phr, or alternatively from about 1 to about 30 phr, or alternatively from about 1 to about 15 phr.

The composition may optionally contain at least one Type B polymer in addition to the Type A polymer(s). Type B polymers have a degree of unsaturation larger than 50 mol %. Suitable Type B polymers are well known in the art and include, but are not limited to, natural rubber, synthetic polyisoprene rubber, styrene-butadiene rubber (SBR), styrene-isoprene rubber, styrene-isoprene-butadiene rubber, butadiene-isoprene rubber, polybutadiene (BR), acrylonitrile-butadiene rubber (NBR), silicone rubber, fluoroelastomers, ethylene acrylic rubber, nitrile rubber, and mixtures thereof.

If the composition also contains at least one Type B polymer, the Type A polymer(s) may be present in an amount of about 1 to about 99 parts per hundred parts of elastomer (phr), or alternatively from about 10 to about 70 phr, or alternatively from about 20 to about 50 phr. The Type A and Type B polymers will together be 100 phr. Accordingly, the polymeric additive is not included in the total parts of polymer in the composition (for example, the composition may contain 70 phr of Type A polymer(s), 30 phr of Type B polymer(s), and 50 phr of polymeric additive).

The composition also contains a filler. The filler may be selected from the group consisting of carbon black, silica, and mixtures thereof. The total amount of filler may be from about 1 to about 200 phr, or alternatively from about 5 to about 100 phr, or alternatively from about 30 to about 80 phr, or from about 40 to 70 phr.

Carbon black may be present in an amount of about 1 to about 200 phr, or alternatively in an amount of about 5 to about 100 phr, or alternatively in an amount of 30 to about 80 phr. Suitable carbon blacks include commonly available, commercially-produced carbon blacks, but those having a surface area of at least 20 m$^2$/g, or preferably, at least 35 m$^2$/g up to 200 m$^2$/g or higher are preferred. Among useful carbon blacks are furnace black, channel blacks, and lamp blacks. A mixture of two or more of the above blacks can be used. Exemplary carbon blacks include, but are not limited to, N-110, N-220, N-339, N-330, N-352, N-550, N-660, as designated by ASTM D-1765-82a.

Examples of reinforcing silica fillers which can be used include wet silica (hydrated silicic acid), dry silica (anhydrous silicic acid), calcium silicate, and the like. Among these, precipitated amorphous wet-process, hydrated silicas are preferred. Silica can be employed in an amount of about 1 to about 100 phr, or alternatively in an amount of about 5 to 80 phr, or alternatively in an amount of about 30 to about 80 phr. The useful upper range is limited by the high viscosity imparted by fillers of this type. Some of the commercially available silicas which can be used include, but are not limited to, HiSil® 190, HiSil® 210, HiSil® 215, HiSil® 233, HiSil® 243, and the like, produced by PPG Industries (Pittsburgh, Pa.). A number of useful commercial grades of different silicas are also available from DeGussa Corporation (e.g., VN2, VN3), Rhone Poulenc (e.g., Zeosil® 1165MP0), and J. M. Huber Corporation.

The surface of the carbon black and/or silica may also be treated or modified to improve the affinity to particular types of polymers. Such surface treatments and modifications are well known to those skilled in the art.

If silica is used as a filler, it may be desirable to use a coupling agent to couple the silica to the polymer. Numerous coupling agents are known, including but not limited to organosulfide polysulfides and organoalkoxymercaptosilanes. Any organosilane polysulfide may be used. Suitable organosilane polysulfides include, but are not limited to, 3,3'-bis(trimethoxysilylpropyl)disulfide, 3,3'-bis(triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxydiethoxysilylethyl)tetrasulfide, 2,2'-bis(tripropoxysilylethyl)pentasulfide, 3,3'-bis(tricycloneoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxyethoxypropoxysilyl 3'-diethoxybutoxy-silylpropyltetrasulfide, 2,2'-bis(dimethylmethoxysilylethyl)disulfide, 2,2'-bis(dimethylsecbutoxysilylethyl)trisulfide, 3,3'-bis(methylbutylethoxysilylpropyl)tetrasulfide, 3,3'-bis(di t-butylmethoxysilylpropyl)tetrasulfide, 2,2'-bis(phenylmethylmethoxysilylethyl)trisulfide, 3,3'-bis(diphenylisopopoxysilylpropyl)tetrasulfide, 3,3'-bis(diphenylcyclohexoxysilylpropyl)disulfide, 3,3'-bis(dimethylethylmercaptosilylpropyl)tetrasulfide, 2,2'-bis(methyldimethoxysilylethyl)trisulfide, 2,2'-bis(methylethoxypropoxysilylethyl)tetrasulfide, 3,3'-bis(diethylmethoxysilylpropyl)tetrasulfide, 3,3'-bis(ethyldisecbutoxysilylpropyl)disulfide, 3,3'-bis(propyldiethoxysilylpropyl)disulfide, 3,3'-bis(butyldimethoxysilylpropyl)trisulfide, 3,3'-bis(phenyldimethoxysilylpropyl)tetrasulfide, 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide and 3,3'-bis(dimethoxyphenylsilyl-2-methylpropyl)disulfide.

Suitable organoalkoxymercaptosilanes include, but are not limited to, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, tripropoxy mercaptopropyl silane, ethoxy dimethoxy mercaptopropylsilane, ethoxy diisopropoxy mercaptopropylsilane, ethoxy didodecyloxy mercaptopropylsilane and ethoxy dihexadecyloxy mercaptopropylsilane.

A representative example of a capped organoalkoxymercaptosilane coupling agent is a liquid 3-octanoylthio-1-propyltriethoxysilane, available as NXT™ Silane from the GE Silicones Company.

Mixtures of various organosilane polysulfide compounds and organoalkoxymercaptosilanes can be used.

The amount of coupling agent in the composition is the amount needed to produce acceptable results, which is easily determined by one skilled in the art. The amount of coupling agent is typically based on the weight of the silica in the composition, and may be from about 0.1% to about 20% by weight of silica, or alternatively from about 1% to about 15% by weight of silica, or alternatively from about 1% to about 10% by weight of silica.

Additional fillers may also be utilized, including but not limited to, mineral fillers, such as clay, talc, aluminum hydrate, aluminum hydroxide and mica. The foregoing additional fillers are optional and can be utilized in varying amounts from about 0.5 phr to about 40 phr.

As mentioned above, a polymeric additive is added to the composition to increase the affinity between the filler and the Type A polymer(s). The polymeric additive may be any polymer or copolymer that is capable of being functionalized with a functional end group, either by functional initiators, functional terminators, or both. Exemplary polymers include, but are not limited to, homopolymers and copolymers of monomers selected from the group consisting of 1,3-butadiene, isoprene, 2-ethyl-1,3-butadiene, 2,3-dimethyl-1,3-butadiene, 1,3-pentadiene, 2-methyl-1,3-pentadiene, 3-methyl-1,3-pentadiene, 4-methyl-1,3-pentadiene, 2,4-dimethyl-1,3-pentadiene, 1,3-hexadiene, 1,2-diphenyl-4-methyl-1-hexene, styrene, α-methylstyrene, p-methylstyrene, vinyl toluene, vinyl anthracene, vinyl pyridines such as 2-vinylpyriene and 4-vinylpyridine, vinyl naphthalene such as 1-vinylnaphthalene, 2-vinylnaphthalene, 1-α-methylvinylnaphthalene, 2-α-methylvinylnaphthalene, and mixtures thereof.

The polymeric additive comprises polymer chains having a functional group on at least one of the ends of the polymer chain. As mentioned above, the functional groups can be imparted on the polymer chain by the use of functional initiators, functional terminators, or both. Suitable functional groups include, but are not limited to, those containing amine, oxime, hydrazine, nitrile, hydroxyl, thiol, carboxyl, urea, urethane, sulfanyl, phosphoryl, silane, tin, and mixtures thereof. The preferred functional groups include those containing amine, tin, silanes, or mixtures thereof. The type of functional group selected is based on the type of filler used and the desired affinity between the Type A polymer(s) and the filler.

The functional group may be added by any method known in the art. As non-limiting examples, U.S. Pat. Nos. 4,603,722, 4,616,069, 4,791,174, 4,929,679, 5,064,907, 5,153,271, 5,219,942, 5,227,431, 5,248,722, 5,244,966, 5,329,005, 5,391,665, 5,442,007, 5,508,333, 5,811,479, and 6,703,448, all of which are incorporated herein by reference in their entirety, disclose various methods of introducing functional groups on the polymer chain end. Of course, other methods are well known to those skilled in the art.

The polymeric additive also has a low degree of unsaturation so that it is miscible with the Type A polymer(s). The polymeric additive may have a degree of unsaturation of no more than about 50 mol %, or alternatively no more than about 30 mol %, or alternatively no more than about 10 mol %. The low degree of unsaturation may be achieved by hydrogenating the polymer chains. Hydrogenation may be carried out in any way known to those skilled in the art. However, the hydrogenation method will depend upon the functional group chosen for the polymeric additive, since the hydrogenation method must allow the functional group to survive, i.e. remain on the end of the polymer chain. An exemplary method of hydrogenation includes placing the polymer in a hydrogenation reactor in the presence of a catalyst. After the catalyst has been added to the reactor, hydrogen gas ($H_2$) is charged to the reactor to begin the hydrogenation reaction. The pressure is adjusted to a desired range via addition of $H_2$, preferably between about 10 and 3000 kPa, more preferably between about 50 and 2600 kPa. $H_2$ may be charged continuously or in individual charges until the desired conversion is achieved. The conversion reaction may be monitored by $H_1$ NMR. Preferred catalysts include known hydrogenation catalysts such as Pt, Pd, Rh, Ru, Ni, and mixtures thereof. The catalysts may be finely dispersed as solids or absorbed on inert supports such as carbon, silica, or alumina. Especially preferred catalysts are prepared from nickel octolate, nickel ethylhexanoate, and mixtures thereof.

Other exemplary methods of hydrogenation include, but are not limited to, the methods disclosed in U.S. Pat. Nos. 5,442,007 and 7,148,292, and Parker et al., *A New Process for the Preparation of Highly Saturated Nitrile Rubber in Latex Form*, Rubber Chem. & Tech., Vol. 65, 245 (1992), which are all incorporated herein by reference in their entirety. Of course, other methods of hydrogenation are well known in the art.

The polymeric additive preferably has a relatively low molecular weight, which allows for the presence of relatively more functional end groups versus a polymer with a high molecular weight. As a result, more sites are available that can interact with the filler. The polymeric additive may have a number average molecular weight of about 1,000 to about 25,000, or alternatively from about 5,000 to about 15,000, as determined by Gel Permeation Chromatography (GPC) using a polystyrene standard. The molecular weight can be controlled by terminating the polymerization when the desired molecular weight is achieved, as is well known to one skilled in the art.

Other ingredients that may be employed in the composition include oils, waxes, scorch inhibiting agents, tackifying resins, reinforcing resins, fatty acids such as stearic acid, peptizers, vulcanization agents and vulcanization accelerators. These ingredients are known in the art, and may be added in appropriate amounts based on the desired physical and mechanical properties of the rubber compound.

The composition can be prepared by mixing the ingredients of the composition together by methods known in the art, such as, for example, by kneading the ingredients together in a Banbury mixer. By way of example, all of the ingredients other than the vulcanization agents and vulcanization accelerators may be mixed in at least one non-productive mixing stage. Subsequently, in a productive mixing stage, the vulcanization agents and vulcanization accelerators may then be mixed with the mixture obtained in the non-productive mixing stage(s). However, these mixing methods are only exemplary and other contemplated methods my be used to prepare the composition.

Without being bound by any theory, it is believed that if the composition contains at least one Type B polymer in addition to the Type A polymer(s) and the aforesaid procedure is utilized to prepare the composition, the polymeric additive will be miscible in the Type A polymer(s) due to the similarity of unsaturation levels. As a result, the filler will have an affinity towards the Type A polymer(s) due to the functional groups in the polymeric additive, and the filler will have a natural affinity towards the Type B polymer(s). Thus, the filler will have an affinity to all polymers in the composition, thereby improving the filler distribution between the multiple polymers.

Optionally, if the composition contains at least one Type B polymer in addition to the Type A polymer(s), the polymers may be mixed with the filler independently of each other. For example, in a first mixing stage the Type A polymer(s) may be mixed with the polymeric additive and a portion of the filler. In a second mixing stage, the Type B polymer(s) may be mixed with the remaining filler. In a third mixing stage, the mixtures obtained in the first two mixing stages may be mixed together, optionally with the remaining ingredients of the composition. Without being bound by any theory, upon mixing the mixtures obtained in the first two mixing stages together, it is believed the polymeric additive will improve the filler retention in the Type A polymer(s), thereby improving the filler distribution between the multiple polymers.

Regardless of the method used to prepare the composition, the Type A polymer(s), the filler, and the polymeric additive should be mixed for a suitable time and at a suitable temperature to ensure the functional groups have reacted with the filler. The time and temperature will vary, depending on the functional group employed in the polymeric additive. The mixing conditions can easily be determined by one skilled in the art.

The composition containing at least one Type A polymer, a filler, and the polymeric additive is particularly useful as a tire component, although other rubber articles may also be formed. Exemplary tire components include, but are not limited to, tread and sidewall. There are many benefits of the inventive composition, including improved crack growth resistance and abrasion resistance.

The present invention will be described in more detail with reference to the following examples. The following examples are presented for purposes of illustration only and are not to be construed in a limiting sense.

EXAMPLE 1

Synthesis Tin-Terminated Polybutadiene

A two-gallon reactor, under nitrogen, was charged with 1599 g of hexane and 1880 g of 19.3% 1,3-butadiene solution in hexane to give a solution of 10% 1,3-butadiene in hexane, followed by the addition of 22.7 ml of 1.6 M butyl lithium solution in hexane and 3.4 ml of 1.6 M 2,2-bis(2'-tetrahydrofuryl)propane solution in hexane. The polymerization was allowed to proceed for one hour at 50° C., after which an equivalent of 1.0 M tributyltin chloride solution to butyl lithium was added to the polymeric anion solution. The solution was agitated for 30 minutes at 50° C. and then dropped into a nitrogen-flushed bottle. The polymer had a number average molecular weight (Mn) of 10,902 and a weight average molecular weight (Mw) of 11,394, as determined by GPC using a polystyrene standard. The saturation level due to vinyl content was 63.5% as determined by $^1$H NMR.

EXAMPLE 2

Synthesis of Hydrogenated Tin-Terminated Polybutadiene Polymeric Additive

A one-gallon reactor, under nitrogen, was charged with 1180 g of the polymer solution obtained from the procedure in Example 1. Hydrogen was then introduced into the reactor to replace the nitrogen. 33 ml of 1.0 M triethylaluminum solution in hexane and 7.3 ml of 8 wt % nickel octanoate solution in hexane were added to an air- and moisture-free bottle, yielding a black suspension which was immediately added to the reactor. Hydrogen was then introduced into the reactor to bring the reactor pressure up to 400 pounds per square inch. The reactor was then heated to a temperature of 121° C. After 24 hours, the reaction was stopped and the polymer was collected as a viscous liquid. The polymer had a Mn of 9,555 and a Mw of 10,080, as determined by GPC using a polystyrene standard. The hydrogenation level was 83.0%, as determined by $^1$H NMR.

EXAMPLE 3

Synthesis of Amine-Terminated Polybutadiene

A two-gallon reactor, under nitrogen, was charged with 973 g of hexane and 1175 g of 19.3% 1,3-butadiene solution in hexane to give a solution of 10% 1,3-butadiene in hexane, followed by the addition of 14.2 ml of 1.6 M butyl lithium solution in hexane and 2.1 ml of 1.6 M 2,2-bis(2'-tetrahydrofuryl)propane solution in hexane. The polymerization was allowed to proceed for one hour at 50° C., after which an equivalent of 1.0 M formaldehyde O-benzyloxime ($CH_2$=N—O—$CH_2$Ph) solution to butyl lithium was added to the polymeric anion solution. After the solution was agitated for 30 minutes at 50° C., 1.7 ml of isopropanol was added. The solution was then dropped into a nitrogen-flushed bottle. The polymer had a Mn of 13,908 and a Mw of 15,912, as determined by GPC using a polystyrene standard. The saturation level due to vinyl content was 64.2% as determined by $^1$H NMR.

EXAMPLE 4

Synthesis of Hydrogenated Amine-Terminated Polybutadiene Polymeric Additive

A one-gallon reactor, under nitrogen, was charged with 2100 g of the polymer solution obtained from the procedure in Example 3. Hydrogen was then introduced into the reactor to replace the nitrogen. 49.9 ml of 1.0 M triethylaluminum solution in hexane and 10.4 ml of 8 wt % nickel octanoate solution in hexane were added to an air- and moisture-free bottle, yielding a black suspension which was immediately added to the reactor. Hydrogen was then introduced into the reactor to bring the reactor pressure up to 400 pounds per square inch. The reactor was then heated to a temperature of 121° C. After 17 hours, the reaction was stopped and the polymer was collected as a viscous liquid. The polymer had a Mn of 11,106 and a Mw of 12,350, as determined by GPC using a polystyrene standard. The hydrogenation level was 76.0%, as determined by $^1$H NMR.

EXAMPLE 5

Compositions Containing a Polymeric Additive

Four masterbatches were prepared as shown in Table 1. The masterbatches were mixed in a Brabender mixer at 40 RPM for 5 minutes, starting at a temperature of 60° C.

TABLE 1

|  | MB1 (PHR) | MB2 (PHR) | MB3 (PHR) | MB4 (PHR) |
|---|---|---|---|---|
| Natural Rubber | 100 | 0 | 0 | 0 |
| Polybutadiene | 0 | 100 | 0 | 0 |
| EPDM[1] | 0 | 0 | 100 | 100 |
| Carbon Black | 55 | 55 | 55 | 61.11 |
| Aromatic Oil | 15 | 15 | 15 | 11.11 |
| Polymeric Additive from Example 2 | 0 | 0 | 0 | 16.67 |
| Stearic Acid | 1.5 | 1.5 | 1.5 | 1.67 |

[1]EP35 from JSR Corporation (52% ethylene content, 8.1% unsaturation)

Half of each masterbatch in Table 1 was extruded at 100° C. with a residence time of 1 minute to produce samples MB1-E, MB2-E, MB3-E, and MB4-E.

The masterbatches were then mixed together in the ratios shown in Table 2 in a Brabender mixer at 60 RPM for 4 minutes, starting at a temperature of 80° C.

TABLE 2

|  | Remill A (PHR) | Remill B (PHR) | Remill C (PHR) | Remill D (PHR) |
|---|---|---|---|---|
| MB1 | 40 | 40 |  |  |
| MB1-E |  |  | 40 | 40 |
| MB2 | 20 | 20 |  |  |
| MB2-E |  |  | 20 | 20 |
| MB3 | 40 |  |  |  |
| MB3-E |  |  | 40 |  |
| MB4 |  | 40 |  |  |
| MB4-E |  |  |  | 40 |

To obtain the compositions shown in Table 3, the remills from Table 2 were mixed with sulfur, zinc oxide, and cure accelerators in a Brabender mixer at 40 RPM for 3 minutes, starting from a temperature of 80° C. The compositions containing the polymeric additive, i.e. Compositions B and D, had slightly modified levels of carbon black and oil in order to try to achieve a modulus similar to Compositions A and C, since the polymeric additive also acts as a plasticizer given its low molecular weight. None of the compositions contained any antioxidants or antiozonants.

TABLE 3

|  | Composition A (PHR) | Composition B (PHR) | Composition C (PHR) | Composition D (PHR) |
|---|---|---|---|---|
| Natural Rubber | 40 | 40 | 40 | 40 |
| Polybutadiene | 20 | 20 | 20 | 20 |
| EPDM[1] | 40 | 40 | 40 | 40 |
| Carbon Black | 55 | 57.44 | 55 | 57.44 |
| Aromatic Oil | 15 | 13.44 | 15 | 13.44 |
| Polymeric Additive from Example 2 | 0 | 6.67 | 0 | 6.67 |
| Stearic Acid | 1.5 | 1.57 | 1.5 | 1.57 |
| Sulfur | 1.5 | 1.5 | 1.5 | 1.5 |

TABLE 3-continued

|  | Composition A (PHR) | Composition B (PHR) | Composition C (PHR) | Composition D (PHR) |
|---|---|---|---|---|
| Zinc Oxide | 3 | 3 | 3 | 3 |
| Cure Accelerators | 0.5 | 0.5 | 0.5 | 0.5 |

[1]EP35 from JSR Corporation (52% ethylene content, 8.1% unsaturation)

Properties of the compositions are shown in Table 4. Mooney viscosity of the compositions was determined in accordance with ASTM D-1646. Compound Mooney ML 1+4 130° C. refers to Mooney viscosity of the uncured compounds at 130° C.

To conduct tensile and crack growth testing, the compositions in Table 3 were vulcanized for 15 minutes at 171° C. Tensile mechanical properties were measured by using the procedure described in ASTM-D 412 at 23° C. The tensile test specimens were round rings 0.127 cm in width and 0.190 cm in thickness. A specific gauge length of 2.54 cm was used for the tensile tests.

Crack Growth Rate (Dc/Dn) was measured in a "pure shear" geometry with a precut using the method of Lake, G. J., Rubber Chemistry and Technology, 68: (3), 435-460, 1995. The testing sheet had a length of 20.32 cm, a height of 64.5 mm and a thickness of 2 mm. A pre-cut of 4.0 cm was performed along the length direction. Cyclic deformation was applied along the height direction with a strain amplitude of 10%, at a frequency of 40 Hz, and at a temperature of 23° C. Images of the propagating crack were recorded automatically at a given interval of cyclic deformation, usually 10,000 cycles. Crack growth rate (dc/dn) was then calculated from the increment of crack length at each cycle (nm/cycles).

TABLE 4

|  |  | Composition A | Composition B | Composition C | Composition D |
|---|---|---|---|---|---|
| ML 1 + 4 (130° C.) |  | 27.9 | 24.4 | 26.4 | 23.3 |
| Crack Growth (dc/dn) | nm/cycle | 105 | 95 | 105 | 80 |
| Ring Tensile | Modulus @ 100% Elongation (Mpa) | 1.28 | 1.01 | 1.16 | 1.09 |
| Ring Tensile | Elongation at Break (%) | 472 | 491 | 491 | 480 |

As can be seen from the results in Table 4, the compositions containing the polymeric additive had improved crack growth resistance. In fact, Composition B had approximately 10% better crack growth resistance than Composition A, and Composition D had approximately 24% better crack growth resistance than Composition C.

The invention claimed is:

1. A tire which comprises a composition comprising:
   a. at least one polymer having a degree of unsaturation of no more than about 50 mol %;
   b. a filler selected from the group consisting of carbon black, silica, and mixtures thereof; and
   c. a polymeric additive comprising a functional end group reactive with said filler,
   wherein said polymeric additive has a degree of unsaturation of no more than about 50 mol % and a number average molecular weight between about 1,000 and about 25,000.

2. The composition of claim 1, wherein said polymer is selected from the group consisting of ethylene propylene rubber (EPR), ethylene propylene diene monomer (EPDM) rubber, butyl rubber, polychloroprene, hydrogenated nitrile rubber, and mixtures thereof.

3. The composition of claim 1, further comprising at least one polymer having a degree of unsaturation of more than 50 mol %.

4. The composition of claim 3, wherein said polymer having a degree of unsaturation of more than 50 mol % is selected from the group consisting of natural rubber, synthetic polyisoprene rubber, styrene-butadiene rubber (SBR), styrene-isoprene rubber, styrene-isoprene-butadiene rubber, butadiene-isoprene rubber, polybutadiene (BR), acrylonitrile-butadiene rubber (NBR), silicone rubber, fluoroelastomers, ethylene acrylic rubber, nitrile rubber, and mixtures thereof.

5. The composition of claim 1, wherein said polymer has a degree of unsaturation of no more than about 10 mol %.

6. The composition of claim 1, wherein said polymeric additive has a degree of unsaturation of no more than about 30 mol %.

7. The composition of claim 1, wherein said polymeric additive has a degree of unsaturation of no more than about 10 mol %.

8. The composition of claim 1, wherein said functional end group is selected from the group consisting of amine, oxime, hydrazine, nitrile, hydroxyl, thiol, carboxyl, urea, urethane, sulfanyl, phosphoryl, silane, tin and mixtures thereof.

9. The composition of claim 1, wherein said polymeric additive has a number average molecular weight between about 5,000 and about 15,000.

10. The composition of claim 1, wherein said polymeric additive is a hydrogenated homopolymer or hydrogenated copolymer of a monomer selected from the group consisting of 1,3-butadiene, isoprene, 2-ethyl-1,3-butadiene, 2,3-dimethyl-1,3-butadiene, 1,3-pentadiene, 2-methyl-1,3-pentadiene, 3-methyl-1,3-pentadiene, 4-methyl-1,3-pentadiene, 2,4-dimethyl-1,3-pentadiene, 1,3-hexadiene, 1,2-diphenyl-4-methyl-1hexene,styrene, a-methyl styrene, p-methylstyrene, vinyl toluene, vinyl anthracene, vinyl pyridine, and vinyl naphthalene and mixtures thereof.

11. The composition of claim 5, wherein said polymeric additive has a degree of unsaturation of no more than about 30 mol % and said functional end group is selected from the group consisting of amine, oxime, hydrazine, nitrile, hydroxyl, thiol, carboxyl, urea, urethane, sulfanyl, phosphoryl, silane, tin and mixtures thereof 12. The composition of claim 11, wherein said functional end group is selected from the group consisting of amine, silane, tin, and mixtures thereof.

13. A method comprising mixing together
   a. at least one polymer having a degree of unsaturation of no more than about 50 mol %;
   b. a filler selected from the group consisting of carbon black, silica, and mixtures thereof; and
   c. a polymeric additive comprising a functional end group reactive with said filler, wherein said polymeric additive has a degree of unsaturation of no more than about 50 mol % and a number average molecular weight between about 1,000 and about 25,000;
   whereby a composition is formed;
   forming a tire from the composition.

14. The method of claim 13, wherein said polymer is selected from the group consisting of ethylene propylene rubber (EPR), ethylene propylene diene monomer (EPDM) rubber, butyl rubber, polychloroprene, hydrogenated nitrile rubber, and mixtures thereof.

15. The method of claim 13, further comprising at least one polymer having a degree of unsaturation of more than 50 mol %.

16. The method of claim 15, wherein said polymer having a degree of unsaturation of more than 50 mol % is selected from the group consisting of natural rubber, synthetic polyisoprene rubber, styrene-butadiene rubber (SBR), styrene-isoprene rubber, styreneisoprene-butadiene rubber, butadiene-isoprene rubber, polybutadiene (BR), acrylonitrilebutadiene rubber (NBR), silicone rubber, fluoroelastomers, ethylene acrylic rubber, nitrile rubber, and mixtures thereof.

17. The method of claim 13, wherein said polymer has a degree of unsaturation of no more than about 10 mol %.

18. The method of claim 13, wherein said polymeric additive has a degree of unsaturation of no more than about 30 mol %.

19. The method of claim 13, wherein said polymeric additive has a degree of unsaturation of no more than about 10 mol %.

20. The method of claim 13, wherein said functional end group is selected from the group consisting of amine, oxime, hydrazine, nitrile, hydroxyl, thiol, carboxyl, urea, urethane, sulfanyl, phosphoryl, silane, tin and mixtures thereof.

21. The method of claim 13, wherein said polymeric additive has a number average molecular weight between about 5,000 and about 15,000.

22. The method of claim 13, wherein said polymeric additive is a hydrogenated homopolymer or hydrogenated copolymer of a monomer selected from the group consisting of 1,3-butadiene, isoprene, 2-ethyl-1,3-butadiene, 2,3-dimethyl-1,3-butadiene, 1,3-pentadiene, 2-methyl-1,3-pentadiene, 3-methyl-1,3-pentadiene, 4-methyl-1,3pentadiene, 2,4-dimethyl-1,3-pentadiene, 1,3-hexadiene, 1,2-diphenyl-4-methyl-1-hexene, styrene, a-methyl styrene, p-methylstyrene, vinyl toluene, vinyl anthracene, vinyl pyridine, vinyl naphthalene and mixtures thereof.

23. The method of claim 17, wherein said polymeric additive has a degree of unsaturation of no more than about 30 mol % and said functional end group is selected from the group consisting of amine, oxime, hydrazine, nitrile, hydroxyl, thiol, carboxyl, urea, urethane, sulfanyl, phosphoryl, silane, tin and mixtures thereof.

24. The method of claim 23, wherein said functional end group is selected from the group consisting of amine, silane, tin, and mixtures thereof.

25. A method comprising:
a. in a mixing stage, mixing together
  i. a polymer (A) having a degree of unsaturation of no more than about 50 mol %,
  ii. a filler selected from the group consisting of carbon black, silica, and mixtures thereof, and
  iii. a polymeric additive comprising a functional end group reactive with said filler, wherein said polymeric additive has a degree of unsaturation of no more than about 50 mol % and a number average molecular weight between about 1,000 and about 25,000;
b. in a separate mixing stage, mixing together
  i. a polymer other than said polymer (A),
  ii. a filler selecting from the group consisting of carbon black, silica, and mixtures thereof; and
c. mixing the mixtures obtained in steps (a) and (b) together;
   whereby a composition is formed;
forming a tire from the composition.

* * * * *